(12) United States Patent
Yoon

(10) Patent No.: US 8,467,007 B2
(45) Date of Patent: Jun. 18, 2013

(54) DISPLAY HAVING DIAGONALLY ORDERED COLUMNS OF LENTICULAR LENS

(75) Inventor: Youngshik Yoon, Valencia, CA (US)

(73) Assignee: Thomson Licensing, Boulogne-Billancourt (FR)

(*) Notice: Subject to any disclaimer, the term of this patent is extended or adjusted under 35 U.S.C. 154(b) by 190 days.

(21) Appl. No.: 12/452,186

(22) PCT Filed: Jun. 27, 2007

(86) PCT No.: PCT/US2007/015078
§ 371 (c)(1),
(2), (4) Date: Dec. 18, 2009

(87) PCT Pub. No.: WO2009/002320
PCT Pub. Date: Dec. 31, 2008

(65) Prior Publication Data
US 2010/0118217 A1    May 13, 2010

(51) Int. Cl.
G02F 1/133 (2006.01)
G02F 1/1335 (2006.01)
G02B 27/22 (2006.01)
H04N 15/00 (2006.01)

(52) U.S. Cl.
USPC ............ 349/15; 349/95; 359/462; 359/463; 348/42; 348/51

(58) Field of Classification Search
USPC .............. 349/15, 95; 359/462–463; 348/42, 348/51
See application file for complete search history.

(56) References Cited

U.S. PATENT DOCUMENTS 6,795,241 B1 * 9/2004 Holzbach .................. 359/463
2003/0063186 A1 * 4/2003 Tomono ..................... 348/51

OTHER PUBLICATIONS

International Search Report, dated Feb. 1, 2008.

* cited by examiner

*Primary Examiner* — Lauren Nguyen
(74) *Attorney, Agent, or Firm* — Robert D. Shedd; Richard LaPeruta

(57) ABSTRACT

A display device includes a screen having first and second overlapping lenticular screen structures. The first overlapping lenticular screen structure is a series of columns having a negative slope and the second overlapping lenticular screen structure is another series of columns having a positive slope. The display provide three dimensional views in horizontal and vertical dimensions and maintains three-dimensional capabilities even when viewers tilt their heads.

7 Claims, 5 Drawing Sheets

E ≠ 0                E = 0

DISPLAY HAVING DIAGONALLY ORDERED COLUMNS OF LENTICULAR LENS

This application claims the benefit, under 35 U.S.C. § 365 of International Application PCT/US2007/015078, filed Jun. 27, 2007, which was published in accordance with PCT Article 21(2) on Dec. 31, 2009 in English.

FIELD OF THE INVENTION

The present invention relates to a three dimensional display device having a lenticular screen structure.

BACKGROUND OF THE INVENTION

Displays having lenticular screens have become one of several different types of stereoscopic devices that are being developed and considered for three dimensional (3D) displays. Typical 3D displays with lenticular screens work well as long as viewers are positioned within certain viewing angles, viewing distances, and viewing orientations with respect to the lenticular screen. The reason is a lenticular screen is a collection of optical lenses that takes advantage of the phenomenon of parallax. In other words, lenticular components guide light from each stripe to each eye correctly for a 3D effect, and therefore each eye has an independent and different picture view. Optimal distance and optimal viewing angle each depend on the lenticular optical properties such as focal length.

FIG. 5 is a cross sectional view of a conventional lenticular screen 18 where the lenticular lenses 21 run in vertical columns and each vertical column includes a series of left pixels 16 designed to be seen by left eyes 19 and each vertical column includes a series of right pixels 17 designed to be seen by right eyes 20. In the figure, the viewing distance is optimized by the lenticular component's optical properties (e.g. focal length) such that the left eye 19 only sees the left pixels 16 and the right eye 20 only sees the right pixels 17. However, as the viewer moves from the optimized position, a blending of the left and right pixels will begin to occur, thereby diminishing the 3D effect. This is called "cross talk."

The lenticular screen 18 has been further improved by constructing the lenticular lenses with liquid crystal material which can change the refractive index of the lenses when the liquid crystal material is poled. Such capability also allows for easy switching between two dimensional (2D) and three dimensional (3D) viewing. However, the position of the viewer is still critical for these lenticular screens with liquid crystal material.

Another 3D display concept is the parallax display. With this technology, the screen includes a parallax barrier instead of lenticular components in front of the left and right images. FIGS. 6A and 6B generally represent a conventional parallax display yielding a vertically interlaced image 11. FIG. 6A shows that the left pixel columns 12 effectively yield the left image 14 and the right pixel columns 13 yield the right image 15. The viewers who are appropriately positioned with respect to the display will see the left pixel columns 12 with their left eye 19 and see the right pixel columns 13 with their right eye 20. FIG. 6B shows how the parallax barrier 28 generally permits the left eye 19 and the right eye 20 to see the left pixels columns 12 and the right pixel columns 13, respectively. As with the conventional lenticular displays, if not appropriately positioned, the viewer will see both the left and right columns with both eyes because light delivery is angle sensitive for a certain separation between two eyes.

There are also other display technologies for 3D viewing. One is the use of passive glasses with polarized light projection. Another is the use active auto-shutter glasses using LCDs. However, it is hard to judge which is better because requirements vary for different applications (e.g., passive methodology is more favored for cinema viewing due to multi-viewing positions and active methodology is typically favored for gaming).

With the current state of the art in 3D lenticular screen and parallax screen technologies having restrictive viewer positional constraints and the other 3D technologies requiring glasses, a need exists for a novel screen that can broaden the viewing latitude without requiring glasses.

SUMMARY OF THE INVENTION

A display device includes a screen having first and second overlapping lenticular screen structures. The first overlapping lenticular screen structure is a series of columns having a negative slope and the second overlapping lenticular screen structure is another series of columns having a positive slope. The columns in each series are parallel and comprise repeat units of convex lenses. A plurality of the columns in each series crosses columns in the other series, wherein each intersection forms an individual lenticular segment or lens. Each lenticular segment has a peak saggital height at the center and decreasing saggital height as a function of the distance from the center of each lenticular segment.

Additionally, the lenticular screens can contain liquid crystal material such that the refractive index of the lenticular screens can be controlled, thereby providing the display with easy conversion capability between two dimension (2D) and three dimension (3D) modes and adjustability for suitable viewing latitudes.

BRIEF DESCRIPTION OF THE DRAWINGS

The invention will now be described by way of example with reference to the accompanying drawings.

DETAILED DESCRIPTION OF THE INVENTION

Figure 1:
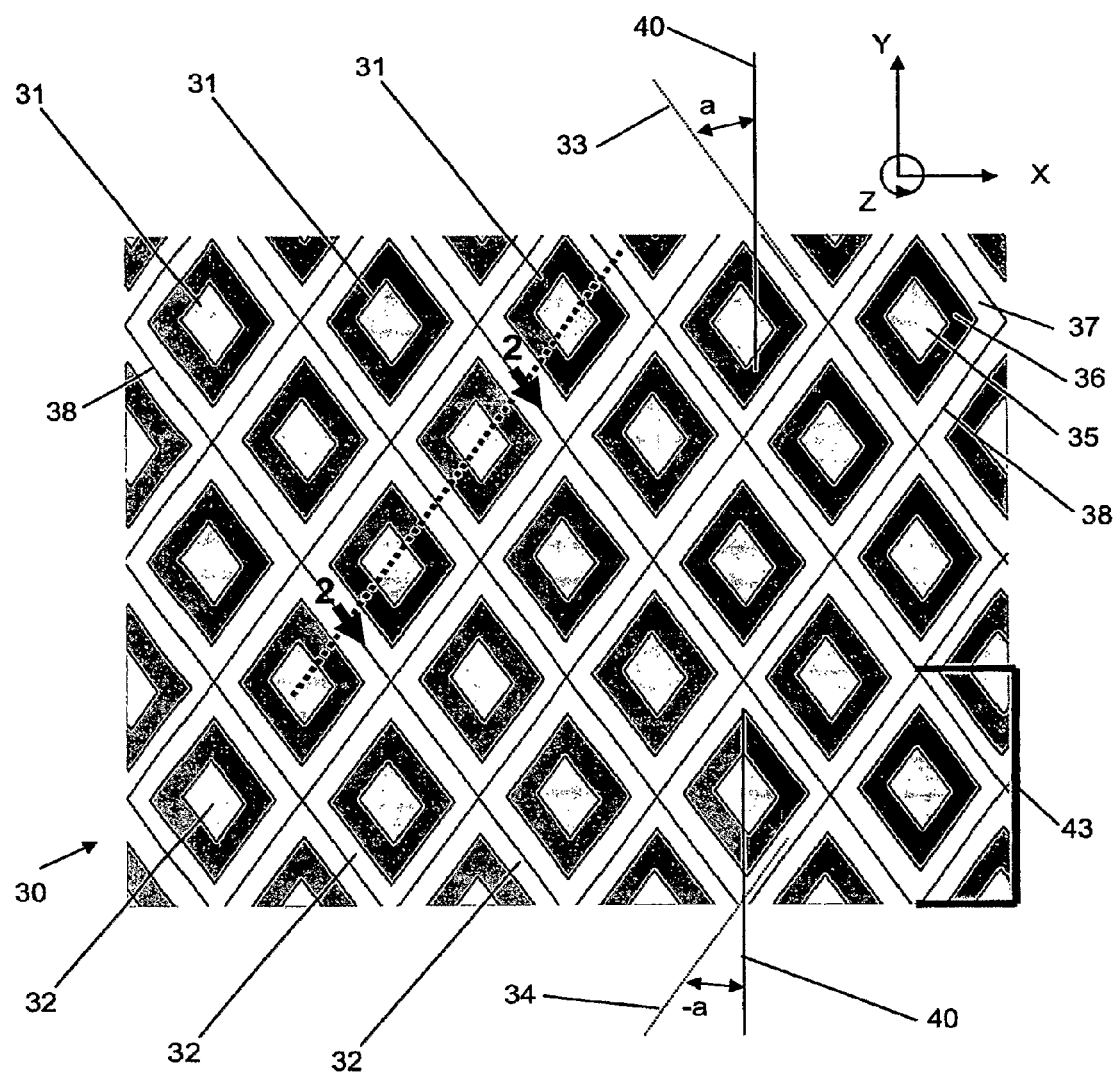
FIG. 1 is a plan view of the lenticular screen according to the invention.

FIG. 1 shows a plan view localized region of the novel overlapping lenticular screen structure 30 according to the invention. The first overlapping lenticular screen structure 31 is a series of first columns having a first configuration and the second overlapping lenticular screen structure 32 is a series of second columns having a second configuration, which is different than the first configuration. In a preferred embodiment, the first configuration is the first columns having a negative slope 33 and the second configuration is the second columns having a positive slope 34. The angle between the slope 33 and the vertical axis is shown as angle a in FIG. 1. The angle between the slope 34 and the vertical axis is shown as angle −a in FIG. 1. Element 40 is a line parallel to the vertical axis Y.

The slopes allow for reduction in the distance between viewers, and therefore, they enable the display to have more viewers in a given viewing angle. The columns in each series are generally parallel. A plurality of the columns in each series cross columns in the other series. In FIG. 1, each intersection of the columns of screen structure 31, 32 comprise repeat units of parallelograms defined by low saggital height points 38. These repeat units are lenticular segments or lens 43. In these repeat units, the low saggital height points 38 surround low sagittal height regions 37, the low sagittal height regions 37 surround medium sagital height regions 36, and medium sagital height regions 36 surround high sagittal height regions 35. Each lenticular segment has a peak point (or region) 39 at the center and decreasing saggital height as a function of the distance from the center of each lenticular segment. This means that the value of the height H decreases with increasing dimension from the center of each lenticular segment. In a preferred embodiment, the low saggital height points have the same saggital position.

Figure 2:
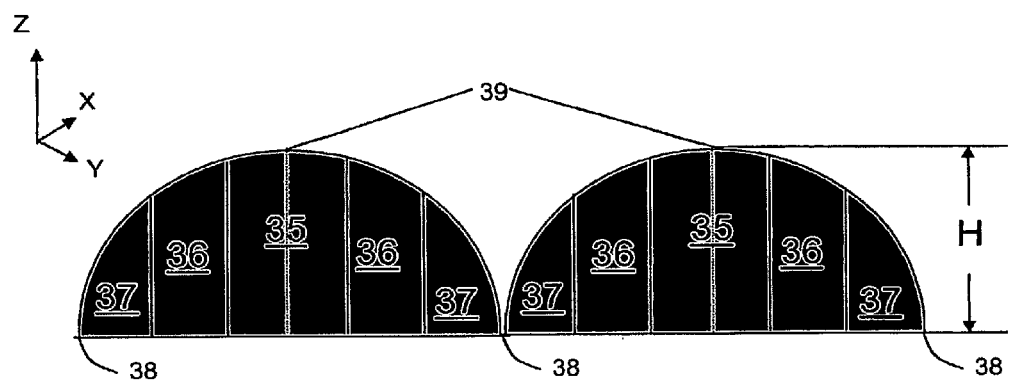
FIG. 2 is a cross sectional view of convex lenses of the lenticular screen according to the invention.

FIG. 2 more clearly shows the profile of the overlapping lenticular screen structures 30, 31 and the nature of the lenticular lenses 43 in FIG. 1. FIG. 2 shows a peak point 39 of height H in a high sagittal height region 35, a medium sagittal height region 36, a low sagittal height region 37 and low saggital height points 38. Height H is the saggital drop of any point in the lenticular segment to the lowest lying point in the lenticular segment. FIG. 2 shows height H for the peak point 39 to the low saggital height points 38. FIG. 2 further shows how the height for each portion or point of the overlapping lenticular screen structures 30, 31 varies as a function of the distance from the center of each lenticular segment, wherein the value of the height H decreases with increasing dimension from the center of each lenticular segment 43.

Figure 3:
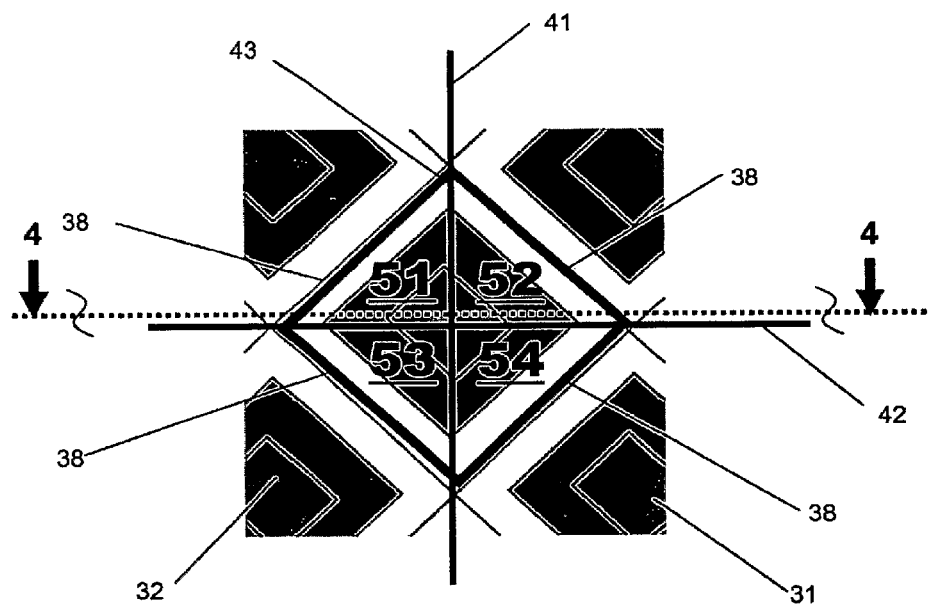
FIG. 3 is a plan view of the pixels of the lenticular screen according to the invention.

FIG. 3 shows how the individual pixels of the screens are defined. Four specific pixels 51, 52, 53, 54 are defined within lenticular lenses or lenticular segments 43. A lens or lenticular segment 43 is the common space between the low saggital height points 38 where two adjacent columns of the first overlapping screen structure 31 of positive slope 33 traverse two adjacent columns of second screen structure 32 of negative slope 34. The lenticular segment 43 is a region that is generally a parallelogram or rhombus-shaped. Specifically, the four pixels are contained within a lenticular segment by a vertical demarcation line 41 (which runs through the upper and lower points of intersection of the low saggital height points 38) and a horizontal demarcation line 41 (which runs through the far left and far right points of intersection of the low saggital height points 38). The pixels are specifically the upper left pixel 51, the lower left pixel 53, the upper right pixel 52 and the lower right pixel 54. The upper left pixel 51 and the lower left pixel 53 are designed to be seen by left eyes of the viewers and the upper right pixel 52 and the lower right pixel 54 are designed to be seen by the right eyes of the viewers. In addition, high frequency of 4-pixel control enables the display to perform 3D vertically and horizontally, while conventional lenticular technology is limited to a horizontal 3D effect.

With the novel lenticular screen provided in FIG. 1, viewers can move such as by tilting sideways and yet still perceive a 3D effect. With the conventional lenticular screen, viewers who tilt their heads can lose the 3D effect due to cross talk between eyes.

Figure 4A:
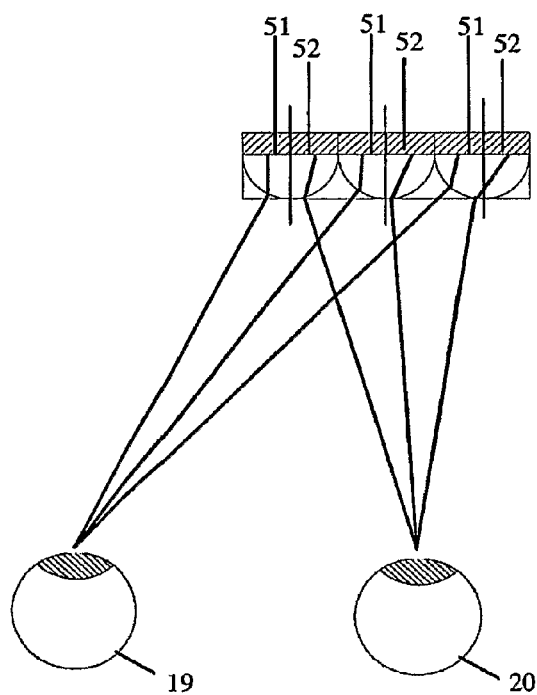
FIG. 4 shows a lenticular screen that includes liquid crystals.
Figure 4B:
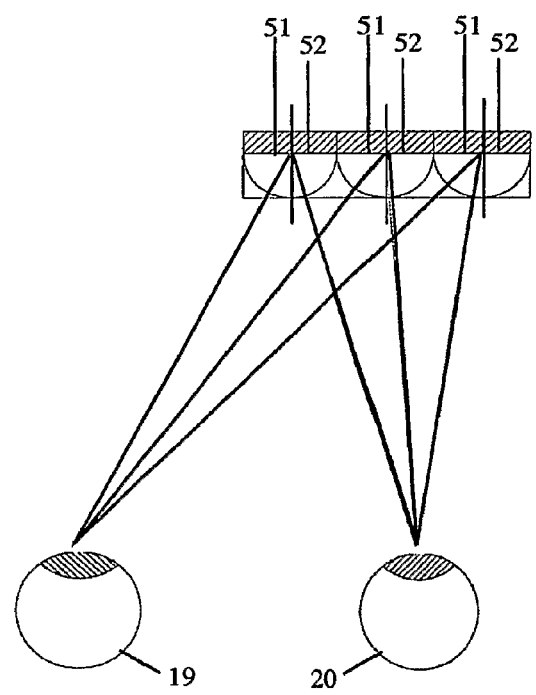
Figure 5:
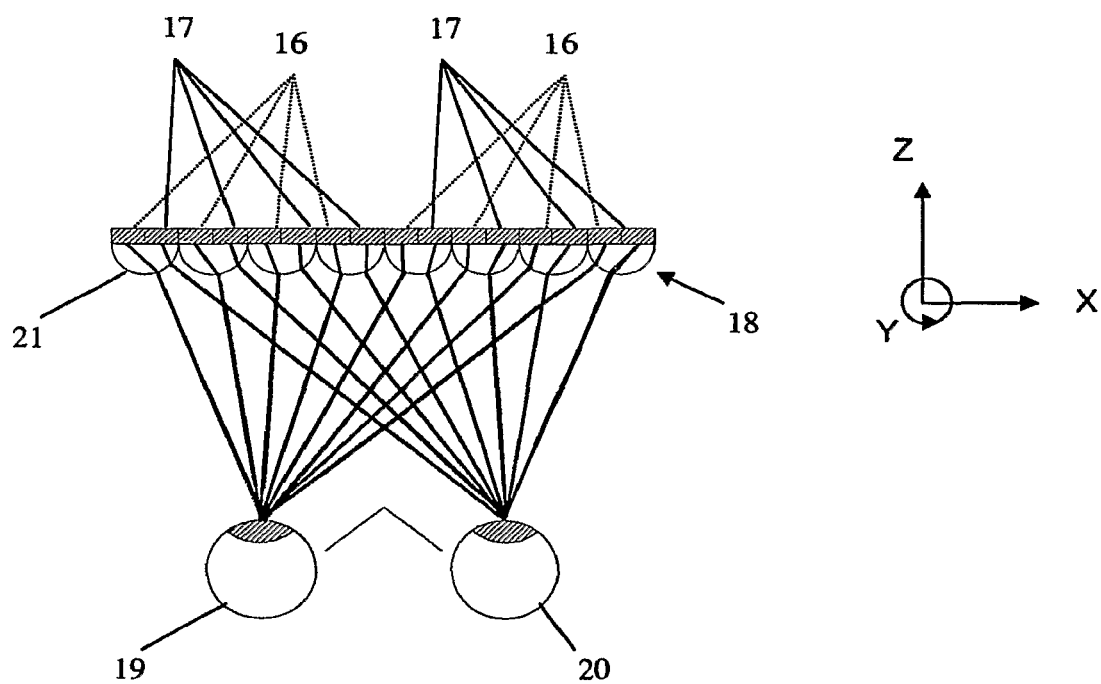
FIG. 5 is a cross sectional view of a conventional lenticular screen.
Figure 6A:
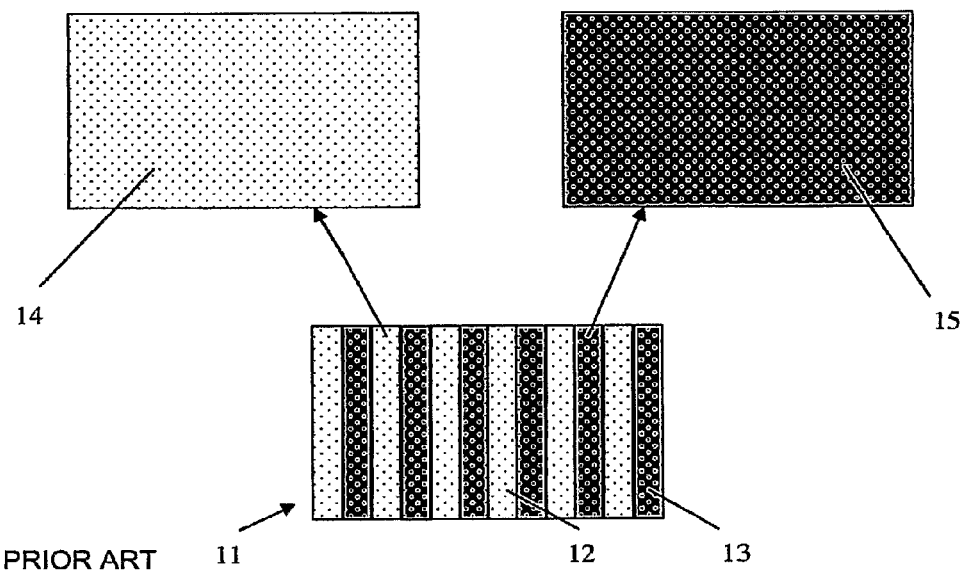
FIG. 6 is a vertically interlaced image for a 3D effect for a conventional parallax screen.
Figure 6B:
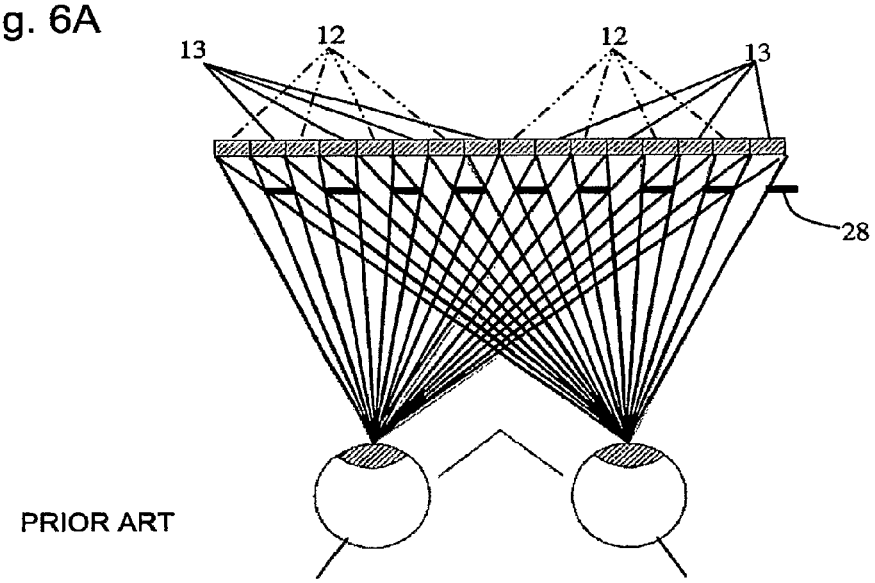

Additionally, the lenticular screens can contain liquid crystal material such that the refractive index of the lenticular screens can be controlled, thereby providing the display with easy conversion capability between 2D and 3D modes and adjustability of suitable viewing distances. FIG. 4 shows how the lenticular screen that includes liquid crystal operates. FIG. 4A shows the case where the liquid crystal is poled, wherein the left eye 19 will see the upper left pixels 51 and the right eye 20 will see the upper right pixels 52. However, if the liquid crystal is not poled as shown in FIG. 4B, the left eye 19 and the right eye 20 will see the both the upper left pixels 51 and upper right pixels 52.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A display comprising:
   a vertical axis Y, a horizontal axis X, and a horizontal axis Z, the vertical axis Y and the horizontal axis X defining the screen viewing plane of the display, the horizontal axis Z bieng orthogonal to the vertical axis Y and the horizontal axis X and extending from the center of the screen viewing plane;
   first columns of lenticular screen structures, the first columns directed along a negative slope in the screen viewing plan; and,
   second columns of lenticular screen structures, the second columns directed along a positive slope in the screen viewing plane; and
   lenticular lenses formed at each intersection of the first columns and the second columns;
   wherein the lenticular lenses are parallelograms having one pair of opposed sides parallel to the positive slope and the other pair of opposed sides parallel to the negative slope; and
   wherein each lenticular lens consists:
     a horizontal demacration line and a vertical demarcation line, the demarcation lines crossing to define four quadrants; and
     an upper left pixel in a first of the quadrants, a lower left pixel in a second of the quadrants, an upper right pixel in a third of the quadrants, and a lower right pixel in a fourth of the quadrants.

2. the display of claim 1 wherein each lenticular lens has a peak saggital height at the intersection of the demarcation lines.

3. The display of claim 2 wherein low saggital height points surround the lenticular lenses.

4. The display of claim 3 wherein the saggital height varies as a function of distance from the center of each lenticular lens, such that the value of the height decreases with increasing dimension from the center of each lenticular lens within each lenticular lens.

5. The display of claim 1 wherein the display is a stereoscopic display in that the left pixels have left eye image and right pixels have right eye images in which the images are different.

6. The display of claim 1 wherein the display has vertical stereoscopy in that the upper pixels have upper images and lower pixels have lower images in which the upper and lower imagers are different.

7. The display of claim 1 wherein the lenticular lenses have liquid crystal devices which change the refractive index of the lenticular lenses when the liquid crystal devices activate.

* * * * *